United States Patent
Bandoh et al.

(10) Patent No.: US 11,458,584 B2
(45) Date of Patent: Oct. 4, 2022

(54) MACHINE TOOL, MACHINED-OBJECT MANUFACTURING METHOD, AND MACHINING SYSTEM

(71) Applicant: KOMATSU NTC LTD., Nanto (JP)

(72) Inventors: Kenichi Bandoh, Hiratsuka (JP); Mohammad Munzir, Fujisawa (JP); Akira Nakayama, Nanto (JP)

(73) Assignee: KOMATSU NTC LTD., Nanto (JP)

( * ) Notice: Subject to any disclaimer, the term of this patent is extended or adjusted under 35 U.S.C. 154(b) by 983 days.

(21) Appl. No.: 16/304,404

(22) PCT Filed: Jun. 27, 2017

(86) PCT No.: PCT/JP2017/023619
§ 371 (c)(1),
(2) Date: Nov. 26, 2018

(87) PCT Pub. No.: WO2018/003813
PCT Pub. Date: Jan. 4, 2018

(65) Prior Publication Data
US 2019/0291228 A1  Sep. 26, 2019

(30) Foreign Application Priority Data
Jun. 28, 2016 (JP) .............................. JP2016-128213

(51) Int. Cl.
*B23Q 15/12* (2006.01)
*G05B 19/404* (2006.01)
*B24B 49/00* (2012.01)

(52) U.S. Cl.
CPC .............. *B23Q 15/12* (2013.01); *B24B 49/00* (2013.01); *G05B 19/404* (2013.01); *G05B 2219/49303* (2013.01)

(58) Field of Classification Search
None
See application file for complete search history.

(56) References Cited

U.S. PATENT DOCUMENTS

| 5,857,814 A | 1/1999 | Jang |
| 6,623,332 B1 | 9/2003 | Junker |

(Continued)

FOREIGN PATENT DOCUMENTS

| CN | 1330582 A | 1/2002 |
| CN | 101784368 A | 7/2010 |

(Continued)

OTHER PUBLICATIONS

Office Action dated Feb. 19, 2020, issued for Korean Patent Application No. 10-2018-7034327 and English translation thereof.

(Continued)

*Primary Examiner* — Ryan A Jarrett
(74) *Attorney, Agent, or Firm* — Locke Lord LLP (57) ABSTRACT

A machine tool includes a tool that machines a workpiece while being contact with the workpiece, a state-quantity-data acquisition unit that acquires state quantity data of the workpiece and of the tool, a state-quantity-estimation-data calculation unit that calculates state quantity estimation data from a simulation model including a device dynamic characteristic model indicating a dynamic characteristic of the tool and a workpiece model indicating a target shape of the workpiece, and a machining-state calculation unit that calculates machining state data indicating a machining state of the workpiece based on the state quantity data and the state quantity estimation data.

12 Claims, 8 Drawing Sheets

(56) References Cited

U.S. PATENT DOCUMENTS

| | | |
|---|---|---|
| 6,810,302 B2 | 10/2004 | Darcy, Jr. et al. |
| 8,715,036 B2 | 5/2014 | Junker |
| 9,846,428 B2 | 12/2017 | Fujimoto et al. |
| 9,952,582 B2 | 4/2018 | Inagaki |
| 2004/0193308 A1 | 9/2004 | Darcy et al. |
| 2010/0173565 A1 | 7/2010 | Junker |
| 2012/0010744 A1 | 1/2012 | Yamashita et al. |
| 2013/0268110 A1* | 10/2013 | Hamada ............... G05B 19/404 700/192 |
| 2013/0272812 A1 | 10/2013 | Hamada et al. |
| 2015/0168938 A1 | 6/2015 | Fujimoto et al. |
| 2016/0114449 A1 | 4/2016 | Inagaki |
| 2017/0185064 A1 | 6/2017 | Masumiya et al. |
| 2019/0291228 A1 | 9/2019 | Bandoh et al. |

FOREIGN PATENT DOCUMENTS

| | | |
|---|---|---|
| CN | 102387892 A | 3/2012 |
| CN | 105598757 A | 5/2016 |
| DE | 3722001 A1 | 1/1989 |
| DE | 102015221000 A1 | 4/2016 |
| EP | 2251120 A1 | 11/2010 |
| EP | 3450096 B1 | 8/2020 |
| JP | 60-229113 A | 11/1985 |
| JP | 03-1742 U | 1/1991 |
| JP | H04-135207 A | 5/1992 |
| JP | H08-110808 A | 4/1996 |
| JP | H08-272418 A | 10/1996 |
| JP | 09-168909 A | 6/1997 |
| JP | 2004-280267 A | 10/2004 |
| JP | 2013-059840 A | 4/2013 |
| JP | 2015-134400 A | 7/2015 |
| JP | 2015-147272 A | 8/2015 |
| JP | 2015-229216 A | 12/2015 |
| JP | 2016-016483 A | 2/2016 |
| JP | 6727041 B2 | 7/2020 |
| WO | 2006/135859 A2 | 12/2006 |
| WO | 2015/114861 A1 | 8/2015 |

OTHER PUBLICATIONS

Office Action dated Mar. 3, 2020, issued for Japanese Patent Application No. 2016-128213 and English translation thereof.
Office Action dated Feb. 2, 2021, issued for Japanese Patent Application No. 2020-079839 and a full machine translation thereof.
Supplementary European Search Report dated Dec. 13, 2019, issued in the corresponding European patent application No. 17820167.9.
Office Action dated Mar. 23, 2020, issued in the corresponding Chinese patent application No. 201780039865.0 and English translation thereof.
Office Action dated Aug. 18, 2021, issued in the corresponding Mexican patent application No. MX/a/2018/015894 and English translation thereof.
International Search Report dated Oct. 3, 2017, issued for PCT/JP2017/023619.
Japanese Decision to Grant a Patent dated Nov. 2, 2021, issued for Japanese Patent Application No. 2020-079839 and English translation thereof.
Decision to Grant a Patent dated Jun. 9, 2020, issued in the corresponding Japanese patent application No. 2016-128213 and English translation thereof.

* cited by examiner

MACHINE TOOL, MACHINED-OBJECT MANUFACTURING METHOD, AND MACHINING SYSTEM

FIELD

The present invention relates to a machine tool, a machined-object manufacturing method, and a machining system.

BACKGROUND

There is, for example, a grinding device known as a machine tool for machining a workpiece (see Patent Literature 1).

CITATION LIST

Patent Literature

Patent Literature 1: Japanese Patent Application Laid-Open No. 2016-016483 A

SUMMARY

Technical Problem

Machined objects manufactured by a machine tool are inspected for machining quality by an inspection apparatus in a post-process. The inspection takes time, and it is difficult to inspect all manufactured machined objects. For this reason, a sampling inspection in which some of the manufactured machined objects are selected and inspected is performed. In the case of the sampling inspection, machined objects having poor machining quality can be shipped. Furthermore, in the case of inspection using an inspection apparatus, machined objects having poor machining quality are found in a post-process, and it is difficult to find them in real time during machining.

An aspect of the present invention is to provide a machine tool, a machined-object manufacturing method, and a machining system capable of inspecting machining quality in real time during machining and suppressing manufacturing machined objects having poor machining quality.

Solution to Problem

According to a first aspect of the present invention, a machine tool comprises: a tool configured to machine a workpiece while being in contact with the workpiece; a state-quantity-data acquisition unit configured to acquire state quantity data of the workpiece and of the tool; a state-quantity-estimation-data calculation unit configured to calculate state quantity estimation data from a simulation model including a device dynamic characteristic model indicating a dynamic characteristic of the tool and a workpiece model indicating a target shape of the workpiece; and a machining-state calculation unit configured to calculate, based on the state quantity data and the state quantity estimation data, machining state data indicating a machining state of the workpiece.

According to a second aspect of the present invention, a machined-object manufacturing method comprises: machining a workpiece by a tool by bringing the workpiece into contact with the tool; acquiring state quantity data of the workpiece and of the tool in the machining; calculating state quantity estimation data from a simulation model including a device dynamic characteristic model indicating a dynamic characteristic of the tool and a workpiece model indicating a target shape of the workpiece; calculating, based on the state quantity data and the state quantity estimation data, machining state data indicating a machining state of the workpiece; outputting the machining state data in the machining; and controlling a machining condition by the tool based on the machining state data in the machining.

According to a third aspect of the present invention, a machining system comprises: a tool configured to machine a workpiece while being in contact with the workpiece; a state-quantity-data acquisition unit configured to acquire state quantity data of the workpiece and of the tool; a state-quantity-estimation-data calculation unit configured to calculate state quantity estimation data from a simulation model including a device dynamic characteristic model indicating a dynamic characteristic of the tool and a workpiece model indicating a target shape of the workpiece; and a machining-state calculation unit configured to calculate, based on the state quantity data and the state quantity estimation data, machining state data indicating a machining state of the workpiece.

Advantageous Effects of Invention

According to an aspect of the present invention, there is provided a machine tool, a machined-object manufacturing method, and a machining system capable of inspecting machining quality in real time during machining and suppressing manufacturing machined objects having poor machining quality.

DESCRIPTION OF EMBODIMENT

Hereinafter, an embodiment of the present invention is described with reference to the drawings, but the present invention is not limited thereto. Constituent elements in the embodiment to be described below can be appropriately combined. Some constituent elements cannot be used.

In the following description, a three-dimensional orthogonal coordinate system is set, and the positional relationship of constituent elements is explained with reference to the three-dimensional orthogonal coordinate system. A direction parallel to the X axis in a predetermined plane is defined as an X axis direction, a direction parallel to the Y axis orthogonal to the X axis in the predetermined plane is defined as a Y axis direction, and a direction parallel to the Z axis orthogonal to the X axis and the Y axis is defined as a Z axis direction. In addition, a rotation or inclination direction about the X axis is defined as a θX direction, a rotation or inclination direction about the Y axis is defined as a θY direction, and a rotation or inclination direction about the Z axis is defined as a θZ direction. The predetermined plane is defined as an XY plane, which is parallel to the horizontal plane in the present embodiment. The Z axis direction is the vertical direction.

[Machine Tool]

Figure 1:
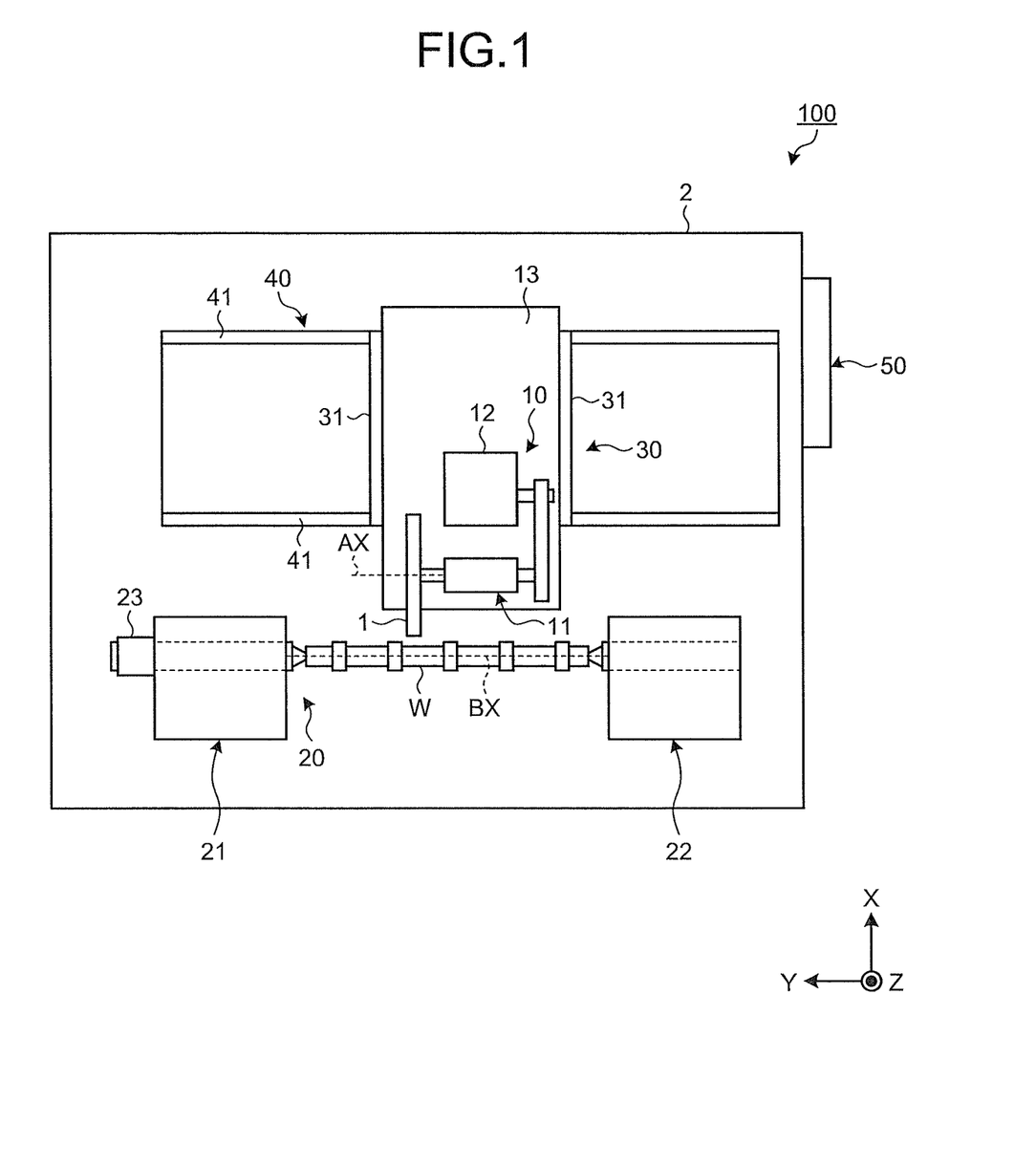
FIG. 1 is a plan view schematically illustrating an example of a machine tool according to the present embodiment.
Figure 2:
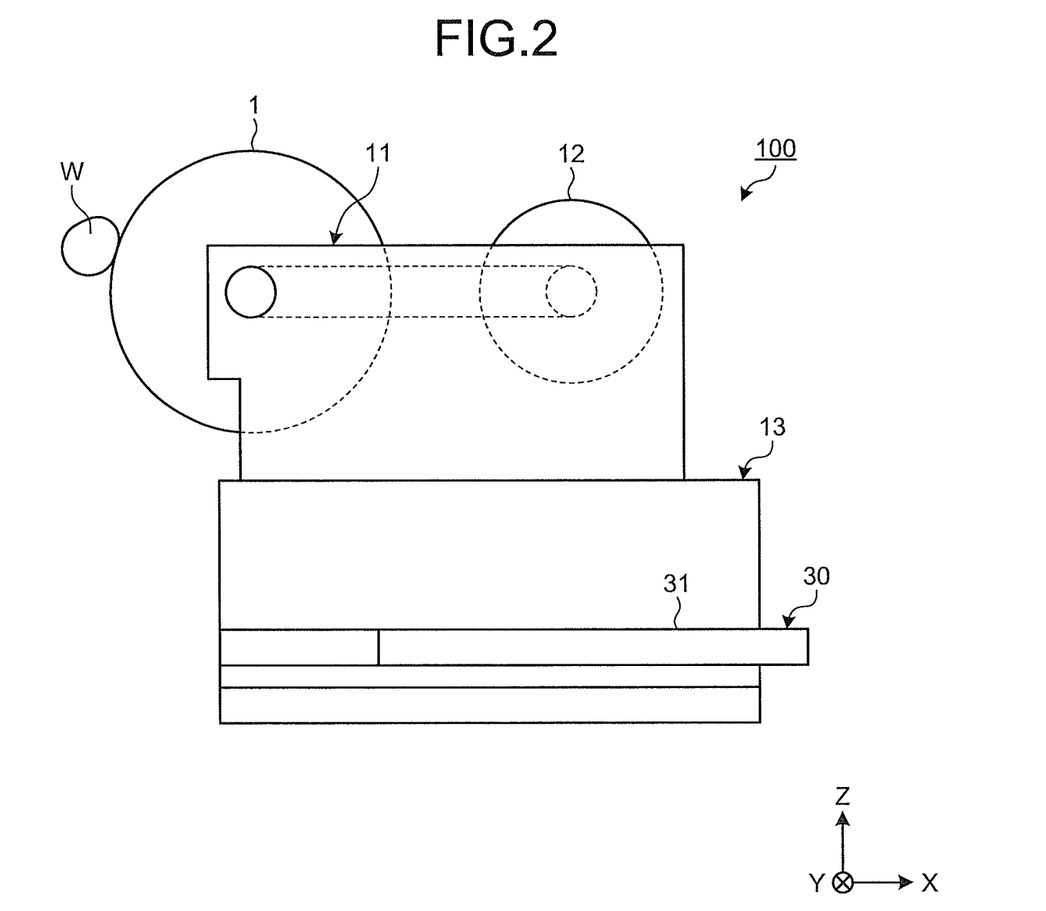
FIG. 2 is a side view schematically illustrating an example of the machine tool according to the present embodiment.

FIG. 1 is a plan view schematically illustrating an example of a machine tool 100 according to the present embodiment. FIG. 2 is a plan view schematically illustrating an example of the machine tool 100 according to the present embodiment. In the present embodiment, the machine tool 100 is a grinding device.

As illustrated in FIGS. 1 and 2, the machine tool 100 includes a tool 1, a first rotating device 10, a second rotating device 20, a driving device 30, a driving device 40, and a control device 50. The tool 1 machines a workpiece W while being in contact with the workpiece W. The first rotating device 10 rotates the tool 1. The second rotating device 20 rotates the workpiece W. The driving device 30 moves the tool 1 in the X axis direction. The driving device 40 moves the tool 1 in the Y axis direction.

The workpiece W is an object to be machined by the machine tool 100. The workpiece W is a columnar member. The machine tool 100 machines the workpiece W to manufacture a camshaft or a crankshaft.

The tool 1 is a grindstone for grinding. The tool 1 grinds the workpiece W by rotating in contact with the workpiece W.

The first rotating device 10 rotates the tool 1 about a rotational axis AX parallel to the Y axis. The first rotating device 10 includes a support mechanism 11 that rotatably supports the tool 1, and a first motor 12 that generates power for rotating the tool 1. The support mechanism 11 and the first motor 12 are supported by a stage member 13 that is movable in the X axis direction.

The second rotating device 20 rotates the workpiece W about a rotational axis BX parallel to the Y axis. The second rotating device 20 includes a support mechanism 21 that rotatably supports one end of the workpiece W, a support mechanism 22 that rotatably supports the other end of the workpiece W, and a second motor 23 that generates power for rotating the workpiece W. The support mechanism 21 and the support mechanism 22 are supported by a base member 2.

The driving device 30 moves the tool 1 in the X axis direction orthogonal to the rotational axis AX of the tool 1. The X axis direction is the feeding direction of the tool 1. The driving device 30 moves the stage member 13 in the X axis direction to move the tool 1 in the X axis direction. The driving device 30 includes a third motor 31 that generates power for moving the tool 1 in the X axis direction. The third motor 31 includes a direct-acting motor. The third motor 31 is a linear motor. The third motor 31 may include a rotary motor, and the tool 1 may be moved in the X axis direction by a ball screw mechanism operated by the third motor 31. As the stage member 13 moves in the −X direction, the tool 1 is moved in the −X direction and is pressed against the workpiece W.

The driving device 40 moves the tool 1 in the Y axis direction. The driving device 40 moves the stage member 13 in the Y axis direction to move the tool 1 in the Y axis direction. The driving device 40 includes a fourth motor 41 that generates power for moving the tool 1 in the Y axis direction. The fourth motor 41 includes a direct-acting motor. The fourth motor 41 is a linear motor. The fourth motor 41 may include a rotary motor, and the tool 1 may be moved in the Y axis direction by a ball screw mechanism operated by the fourth motor 41. The stage member 13 is supported by the base member 2 via the driving device 30 and the driving device 40.

The control device 50 includes a computer system. The control device 50 includes a processor, such as a central processing unit (CPU), a storage device including a non-volatile memory, such as a read only memory (ROM), and a volatile memory, such as a random access memory (RAM), and an input/output interface device.

[Control System]

Figure 3:
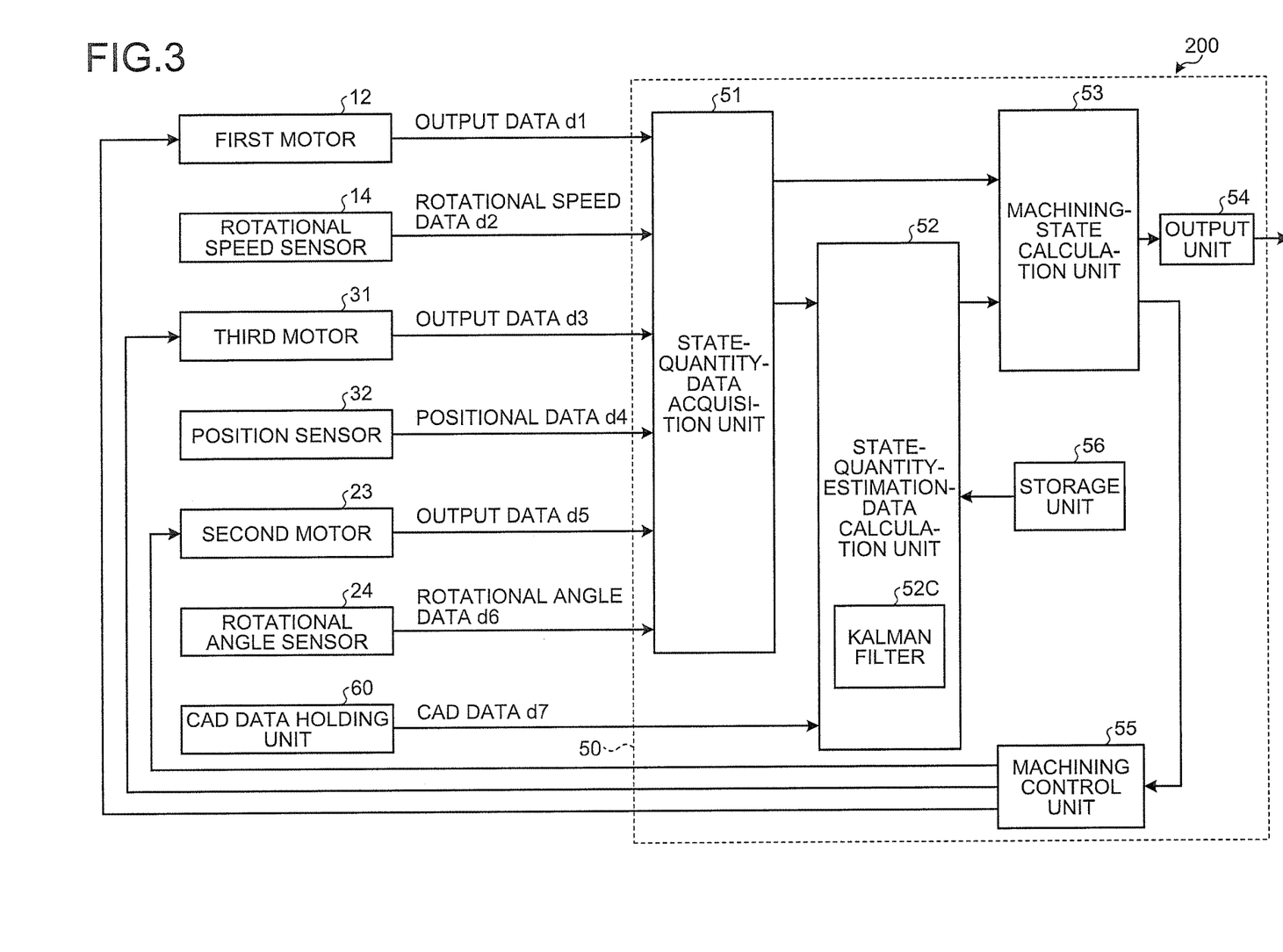
FIG. 3 is a functional block diagram illustrating an example of a control device according to the present embodiment.

Next, an example of a control system 200 of the machine tool 100 according to the present embodiment is described. FIG. 3 is a functional block diagram illustrating an example of the control system 200 according to the present embodiment.

As illustrated in FIG. 3, the control system 200 includes a control device 50, a first motor 12, a rotational speed sensor 14, a third motor 31, a position sensor 32, a second motor 23, a rotational angle sensor 24, and a computer-aided-design (CAD) data holding unit 60. The first motor 12 generates power for rotating the tool 1 about the rotational axis AX. The rotational speed sensor 14 detects the rotational speed of the tool 1. The third motor 31 generates power for moving the tool 1 in the X axis direction. The position sensor 32 detects the position of the tool 1 in the X axis direction. The second motor 23 generates power for rotating the workpiece W about the rotational axis BX. The rotational angle sensor 24 detects the rotational angle of the workpiece W. The CAD data holding unit 60 holds CAD data which is design data of the workpiece W.

The control device 50 includes a state-quantity-data acquisition unit 51, a state-quantity-estimation-data calculation unit 52, and a machining-state calculation unit 53. The state-quantity-data acquisition unit 51 acquires state quantity data of the workpiece W and of the tool 1. The state-quantity-estimation-data calculation unit 52 calculates state quantity estimation data from a simulation model including a device dynamic characteristic model indicating a dynamic characteristic of the tool 1 and a workpiece model indicating a target shape of the workpiece W. The machining-state calculation unit 53 calculates, based on the state quantity data and the state quantity estimation data, machining state data indicating a machining state of the workpiece W.

The control device 50 further includes an output unit 54, a machining control unit 55, and a storage unit 56. The output unit 54 outputs the machining state data calculated by the machining-state calculation unit 53. The machining control unit 55 controls a machining condition of the tool 1 based on the machining state data calculated by the machining-state calculation unit 53.

The simulation model is preset based on functions, maps or the like and stored in the storage unit 56.

The state quantity means a quantity uniquely determined by the tool 1 or the state of the workpiece W in contact with the tool 1. In the present embodiment, the state quantity data includes output data d1 of the first motor 12, rotational speed data d2 of the tool 1 detected by the rotational speed sensor 14, output data d3 of the third motor 31, positional data d4 of the tool 1 in the X axis direction detected by the position sensor 32, output data d5 of the second motor 23, and rotational angle data d6 of the workpiece W detected by the rotational angle sensor 24.

The output data d1 of the first motor 12 includes the torque of the first motor 12. The output data d1 is derived based on a current value output from the first motor 12. The output data d1 is output to the state-quantity-data acquisition unit 51.

The rotational speed sensor 14 includes, for example, a rotary encoder, and detects the rotational speed data d2 indicating the rotational speed of the tool 1. The rotational speed data d2 is output to the state-quantity-data acquisition unit 51.

The output data d3 of the third motor 31 includes the thrust of the third motor 31. The output data d3 is derived based on a current value output from the third motor 31. The output data d3 is output to the state-quantity-data acquisition unit 51.

The position sensor 32 includes, for example, a linear encoder, and detects the positional data d4 indicating the position of the tool 1 in the X axis direction. In the present embodiment, the position sensor 32 detects the moving amount of the third motor 31 to detect the positional data d4 of the tool 1. The positional data d4 is output to the state-quantity-data acquisition unit 51.

The output data d5 of the second motor 23 includes the torque of the second motor 23. The output data d5 is derived based on a current value output from the second motor 23. The output data d5 is output to the state-quantity-data acquisition unit 51.

Rotational angle data 24 includes, for example, a rotary encoder, and detects the rotational angle data d6 indicating the rotational angle of the workpiece W. The rotational angle data d6 is output to the state-quantity-data acquisition unit 51.

The CAD data holding unit 60 holds the CAD data d7. The CAD data d7 includes target shape data of the workpiece W and physical property data of the workpiece W. The target shape data of the workpiece W includes sectional shape data of the workpiece W orthogonal to the rotational axis BX.

The state-quantity-data acquisition unit 51 acquires, as the state quantity data, the output data d1, the rotational speed data d2, the output data d3, the positional data d4, the output data d5, and the rotational angle data d6. The state quantity data is not limited to the output data d1, the rotational speed data d2, the output data d3, the positional data d4, the output data d5, and the rotational angle data d6. The state quantity data may include, for example, a coolant flow rate.

The state-quantity-estimation-data calculation unit 52 calculates, as the state quantity estimation data, a machining resistance variation from the device dynamic characteristic model indicating the dynamic characteristic of the tool 1. The state-quantity-estimation-data calculation unit 52 further calculates, based on the CAD data d7, a variation of the contact angle or the contact position between the tool 1 and the workpiece W as the state quantity estimation data from the workpiece model indicating the target shape of the workpiece W.

The device dynamic characteristic model is calculated by modeling the tool 1 and system identification. To model means the process for constructing a mathematical model that characterizes the behavior of an object. The object is transformed into a simplified mathematical expression by being modeled. For example, the device dynamic characteristic model having a mass component, a damper component, and a spring component is calculated for the tool 1.

System identification means the process for verifying the correctness of the previously-performed modeling by experiments. In the system identification, for example, input signals having various frequencies are experimentally input to the tool 1, and the amplitudes or phases output from the tool 1 are measured. In the system identification, the speed of the tool 1 is further measured when input signals having various frequencies are input to the tool 1. The correctness of the modeling is experimentally verified by the system identification.

Based on the result of the system identification, dynamic characteristic data indicating the dynamic characteristic of the tool 1 is derived. The dynamic characteristic data of the tool 1 includes the mass component, the damper component, and the spring component of the tool 1. The dynamic characteristic data of the tool 1 further includes known data on the tool 1 such as the outer shape and the size of the tool 1.

The workpiece model is calculated based on the CAD data. The workpiece model includes the target shape data of the workpiece W in machining. The target shape data of the workpiece W includes sectional shape data of the workpiece W orthogonal to the rotational axis BX. The workpiece model further includes the physical property data of the workpiece W such as the elastic modulus of the workpiece W. The workpiece model further includes dynamic characteristic data of the workpiece W. The dynamic characteristic data of the workpiece W includes, for example, the mass component, the damper component, and the spring component of the workpiece W. By calculating the workpiece model, for example, a bending amount variation of the workpiece W when an external force acts is calculated.

The state-quantity-estimation-data calculation unit 52 includes a plurality of Kalman filters 52C, and can extract a plurality pieces of state quantity data from a set of input/output data. The state-quantity-estimation-data calculation unit 52 can extract, based on, for example, the output data d1 from the first motor 12 and the rotational speed data d2 from the rotational speed sensor 14, the grinding resistance of the tool 1, the machining start point of the workpiece W, the wear amount of the tool 1, and the like as the state quantity estimation data.

The machining-state calculation unit 53 calculates the machining state data indicating the machining state of the workpiece W, based on the state quantity data acquired by the state-quantity-data acquisition unit 51 and the state quantity estimation data calculated by the state-quantity-estimation-data calculation unit 52 using the simulation model. The state quantity data supplied to the machining-state calculation unit 53 includes the state quantity estimation data extracted by the Kalman filter 52C of the state-quantity-estimation-data calculation unit 52. The state quantity data supplied to the machining-state calculation unit 53 further includes the output data d1 supplied from the first motor 12, the rotational speed data d2 supplied from the rotational speed sensor 14, the output data d3 supplied from the third motor 31, the positional data d4 supplied from the position sensor 32, the output data d5 supplied from the second motor 23, and the rotational angle data d6 supplied from the rotational angle sensor 24.

The state-quantity-estimation-data calculation unit 52 calculates the machining resistance of the tool 1 based on the output data d1 of the first motor 12, the rotational speed data d2 of the tool 1, and the simulation model. In the present embodiment, the machining resistance of the tool 1 is the grinding resistance of the tool 1. When the output data d1 is input to the simulation model, the rotational speed data of the tool 1 in the idle state, in which the tool 1 and the workpiece W are not in contact, is calculated. The state-quantity-estimation-data calculation unit 52 can calculate the machining resistance of the tool 1 based on the difference between the rotational speed data of the tool 1 in the idle-state tool 1 calculated based on the output data d1 and the simulation model, and the rotational speed data d2 detected by the rotational speed sensor 14.

The machining resistance of the tool 1 may be the grinding resistance extracted by the Kalman filter 52C of the state-quantity-estimation-data calculation unit 52.

The machining-state calculation unit 53 can calculate, based on the machining resistance and the workpiece model, bending amount variation data indicating the bending amount of the workpiece W. The machining resistance is equivalent to the load acting on the workpiece W. In the present embodiment, the load acting on the workpiece W is the grinding force acting on the workpiece W. As described above, the workpiece model includes the sectional shape data of the workpiece W and the physical property data of the workpiece W. The machining-state calculation unit 53 can calculate the bending amount variation data of the workpiece W based on the load acting on the workpiece model and the workpiece model.

The machining-state calculation unit 53 calculates a shape error variation of the workpiece W based on control command data to be output to the third motor 31 and the calculated bending amount variation data of the workpiece W.

Figure 4:
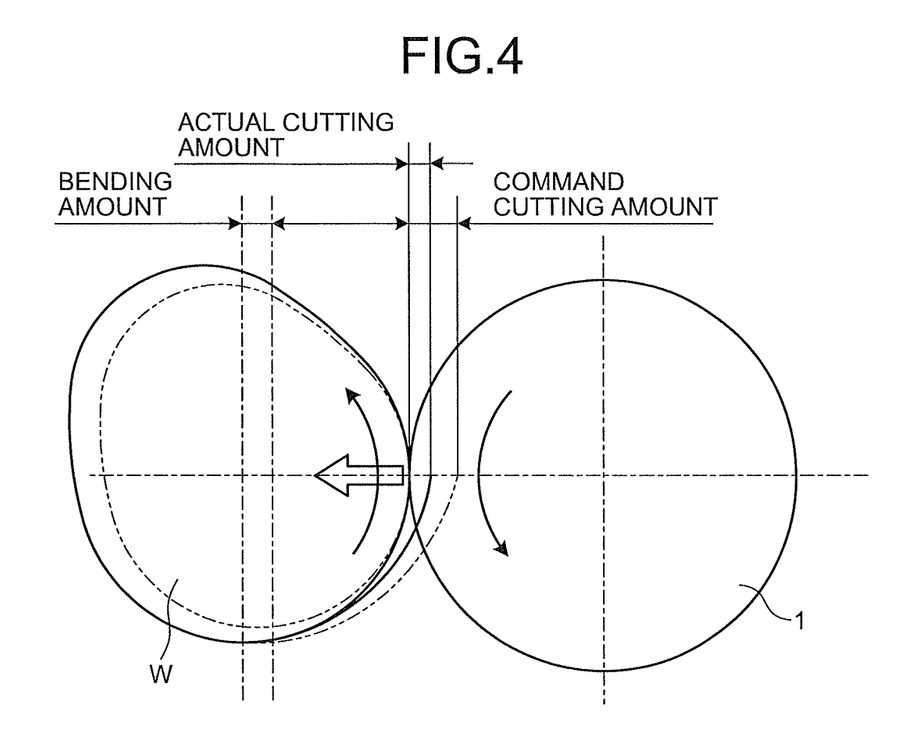
FIG. 4 is a schematic diagram for explaining the behavior of a workpiece according to the present embodiment.

FIG. 4 is a schematic diagram illustrating the relationship between the control command data output to the third motor 31 and the bending amount of the workpiece W according to the present embodiment. Based on the control command data, a command cutting amount for the workpiece W is calculated. The command cutting amount indicating the target cutting amount of the workpiece W includes a target operating amount of the third motor 31. When the workpiece W is bent due to the grinding force acting on the workpiece W, the workpiece W escapes from the tool 1. As a result, the actual cutting amount indicating the actual cutting amount of the workpiece W becomes smaller than the command cutting amount by the amount corresponding to the bending amount. That is, when the workpiece W is bent by the cutting force acting on the workpiece W, the workpiece W is machined only by an amount smaller than the command cutting amount, and a shape error occurs in the workpiece W with respect to the target shape. When the grinding force acting on the workpiece W varies depending on the target shape and the machining condition of the workpiece W, the bending amount of the workpiece W, that is, the shape error of the workpiece W with respect to the target shape varies.

Thus, the machining-state calculation unit 53 can calculate the shape error variation of the workpiece W with respect to the target shape defined by the CAD data, based on the control command data output to the third motor 31 and the calculated bending amount variation data of the workpiece W.

Figure 5:
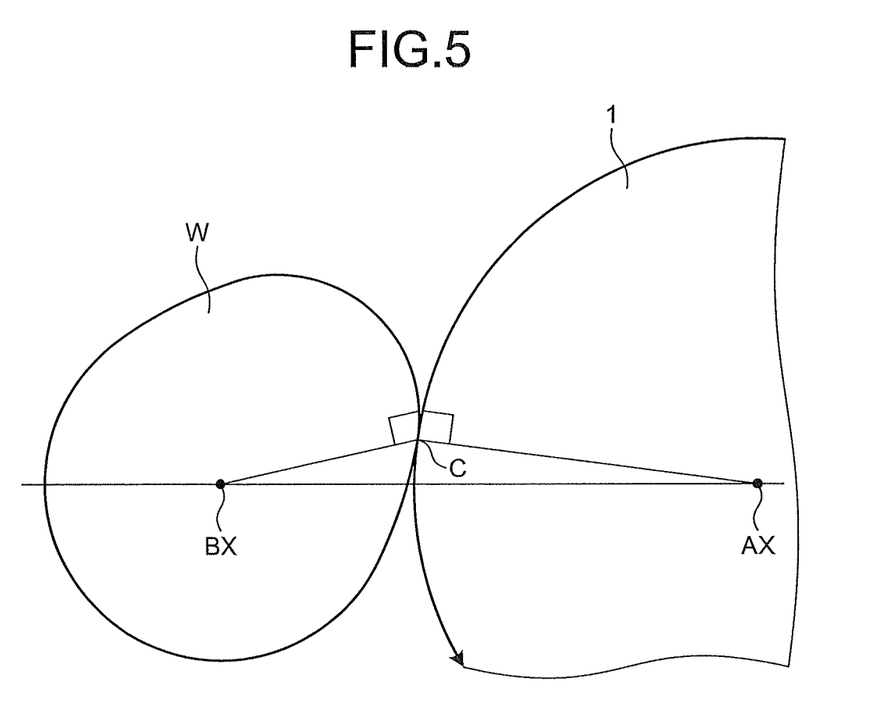
FIG. 5 is a diagram schematically illustrating a relationship between a workpiece and a tool according to the present embodiment.

The state-quantity-estimation-data calculation unit 52 further calculates a contact position C between the workpiece W and the tool 1 based on the rotational angle data d6 and the workpiece model. The contact position C indicates a machining point at which the workpiece W is machined by the tool 1.

FIG. 5 is a schematic diagram illustrating the relationship between the workpiece W and the tool 1 according to the present embodiment. The tool 1 rotates about the rotational axis AX, and the workpiece W rotates about the rotational axis BX. The workpiece W is machined into a camshaft or a crankshaft. In the section orthogonal to the rotational axis BX, the workpiece W is non-circular. In the section orthogonal to the rotational axis AX, the tool 1 is substantially circular.

When the rotating non-circular workpiece W is in contact with the rotating circular tool 1, the distance between the contact position C, at which the workpiece W comes into contact with the tool 1, and the rotational axis BX changes as the workpiece W rotates.

As described above, the workpiece model includes the sectional shape data of the workpiece W orthogonal to the rotational axis BX. Thus, if the rotational angle of the workpiece W in the rotation direction about the rotational axis BX is known, the contact position C at which the workpiece W comes into contact with the tool 1 is derived. The state-quantity-estimation-data calculation unit 52 can calculate the contact position C between the workpiece W and the tool 1 based on the rotational angle data d6 and the workpiece model.

The machining-state calculation unit 53 calculates the surface unevenness of the workpiece W based on the output data d3 of the third motor 31 and the positional data d4 of the tool 1 in the X axis direction.

The rotational axis AX of the tool 1 varies, and the tool 1 can wobble. When the tool 1 wobbles, chattering vibration occurs in the tool 1, and at least one of the tool 1 and the workpiece W slightly vibrates in the X axis direction. When chattering vibration occurs, fine unevenness is formed on the surface of the workpiece W.

When chattering vibration occurs, the output data d3 of the third motor 31 that moves the tool 1 in the X axis direction varies. Thus, the machining-state calculation unit 53 can calculate, based on the output data d3 of the third motor 31, the chattering force [N] indicating the occurrence of the chattering vibration and the chattering vibration power, as the machining state data. The machining-state calculation unit 53 can further calculate, based on the positional data d4 of the tool 1 in the X axis direction detected by the position sensor 32, the chattering amount [μm] indicating the amplitude of the chattering vibration, as the machining state data.

In the present embodiment, the output data d3 in the frequency band corresponding to the rotational speed of the tool 1 is extracted by a filtering process from the output data d3 acquired by the state-quantity-data acquisition unit 51. The machining-state calculation unit 53 calculates the chattering force based on the extracted output data d3. Similarly, the positional data d4 in the frequency band corresponding to the rotational speed of the tool 1 is extracted by a filtering process from the positional data d4 acquired by the state-quantity-data acquisition unit 51. The machining-state calculation unit 53 calculates the chattering amount based on the extracted positional data d4. The frequency band corresponding to the rotational speed of the tool 1 is calculated from the rotational speed data d2 of the tool 1.

The output unit 54 outputs the machining state data calculated by the machining-state calculation unit 53. The output unit 54 outputs the machining state data in machining by the tool 1. That is, the output unit 54 outputs the machining state data of the workpiece W in real time during the machining of the workpiece W.

The machining control unit 55 controls the machining condition by the tool 1 based on the machining state data calculated by the machining-state calculation unit 53. In the present embodiment, the machining control unit 55 feedback-controls at least one of the first motor 12, the third motor 31, and the second motor 23 based on the machining state data calculated by the machining-state calculation unit 53.

[Machined-Object Manufacturing Method]

Figure 6:
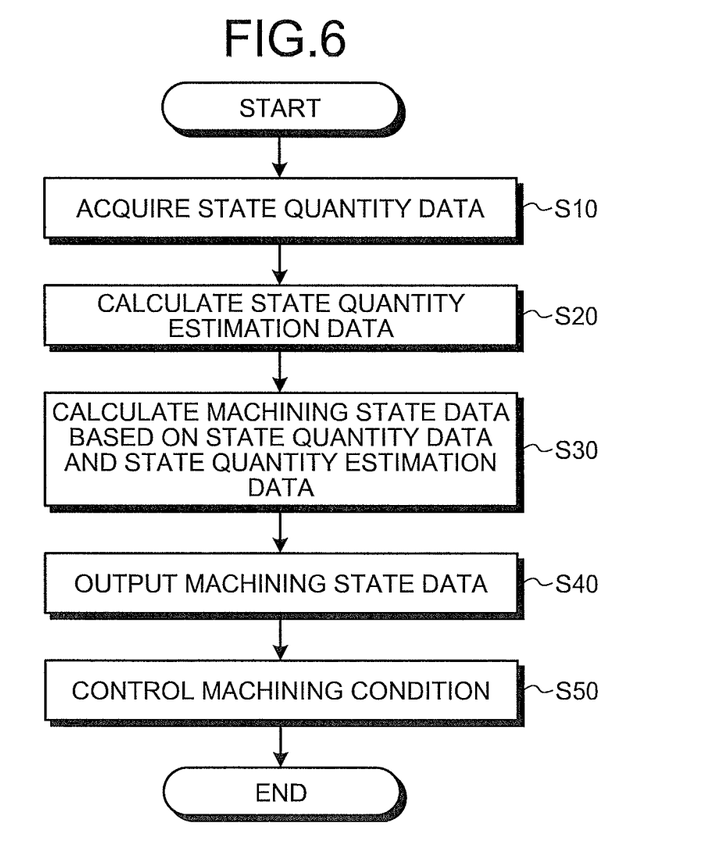
FIG. 6 is a flowchart illustrating an example of a machined-object manufacturing method according to the present embodiment.

Next, a machined-object manufacturing method according to the present embodiment is described. FIG. 6 is a flowchart illustrating an example of a machined-object manufacturing method according to the present embodiment. In the present embodiment, a camshaft or a crankshaft, which is a machined object, is manufactured from the workpiece W using the machine tool 100.

The workpiece W is supported by the support mechanism 21 and the support mechanism 22. The tool 1 is rotated about the rotational axis AX by the first rotating device 10, and the workpiece W is rotated about the rotational axis BX by the second rotating device 20. The tool 1 is moved in the −X direction by the driving device 30 so that the tool 1 is brought into contact with the workpiece W while the tool 1 and the workpiece W are rotating.

While the workpiece W and the tool 1 are in contact with each other and the workpiece W is being machined by the tool 1, the state-quantity-data acquisition unit 51 acquires the state quantity data including the output data d1 of the first motor 12, the rotational speed data d2 of the tool 1 detected by the rotational speed sensor 14, the output data d3 of the third motor 31, the positional data d4 of the tool 1 in the X axis direction detected by the position sensor 32, the output data d5 of the second motor 23, and the rotational angle data d6 of the workpiece W detected by the rotational angle sensor 24 (step S10).

The state-quantity-estimation-data calculation unit 52 calculates the state quantity estimation data from the simulation model including the device dynamic characteristic model indicating the dynamic characteristic of the tool 1 and the workpiece model indicating the target shape of the workpiece W (step S20).

The machining-state calculation unit 53 calculates the machining state data indicating the machining state of the workpiece W, based on the state quantity data acquired by the state-quantity-data acquisition unit 51 and the state quantity estimation data calculated by the state-quantity-estimation-data calculation unit 52 (step S30).

In the present embodiment, the state-quantity-estimation-data calculation unit 52 calculates the machining resistance of the tool 1 based on the output data d1 of the first motor 12, the rotational speed data d2 of the tool 1, and the simulation model. Note that, the Kalman filter 52C of the state-quantity-estimation-data calculation unit 52 may extract the machining resistance of the tool 1 from the output data d1 of the first motor 12.

After the machining resistance of the tool 1 is derived, the machining-state calculation unit 53 calculates bending amount variation data of the workpiece W based on the machining resistance and the workpiece model. The machining resistance is equivalent to the load acting on the workpiece W. The workpiece model includes the target shape data of the workpiece W, the physical property data of the workpiece W, and the dynamic characteristic data of the workpiece W. The machining-state calculation unit 53 can calculate the bending amount variation data indicating the bending amount variation of the workpiece W, based on the load acting on the workpiece W and the workpiece model.

By calculating the bending amount variation data of the workpiece W, the actual cutting amount with respect to the command cutting amount is calculated as described with reference to FIG. 4. By calculating the actual cutting amount, the shape error variation of the workpiece W with respect to the target shape defined by the CAD data is calculated. The machining-state calculation unit 53 can calculate, as the machining state data, error data indicating the shape error variation of the workpiece W with respect to the target shape.

As described with reference to FIG. 5, the state-quantity-estimation-data calculation unit 52 can calculate the contact position C between the workpiece W and the tool 1 based on the rotational angle data d6 of the workpiece W, the positional data d4 of the tool 1, and the workpiece model. The contact position C indicates a machining point at which the workpiece W comes into contact with the tool 1. By calculating the contact position C, the machining-state calculation unit 53 can grasp how much and which part of the workpiece W is machined. In other words, the machining-state calculation unit 53 can calculate the shape error variation of each of a plurality of portions of the workpiece W with respect to the target shape in the rotation direction about the rotational axis BX.

The machining-state calculation unit 53 can calculate, based on the output data d3 of the third motor 31 and the positional data d4 of the tool 1, the depth and the pitch of the surface unevenness of the workpiece W generated due to the chattering vibration.

That is, in the present embodiment, the machining-state calculation unit 53 can calculate, as the machining state data of the workpiece W, the error data of each portion of workpiece W in the rotation direction with respect to the target shape and the surface unevenness data of the workpiece W due to the chattering vibration, based on the state quantity data acquired during the machining of the workpiece W.

The machining-state calculation unit 53 can further calculate and estimate the wear amount of the tool 1 based on the machining resistance of the tool 1, which is the state quantity estimation data, and the number of workpieces W machined by the tool 1. For example, after the machining resistance (grinding resistance) of the tool 1 to be estimated has stabilized, each of a plurality of workpieces W is roughly ground by rotating each workpiece W twice, and the wear amount of the tool 1 when each workpiece W is roughly ground is acquired. The machining-state calculation unit 53 calculates a representative wear amount indicating the average value of the wear amount of the tool 1 when each workpiece W is roughly ground. The representative wear amount is stored in the storage unit 59. The machining-state calculation unit 53 can estimate the wear amount of the tool 1 based on the calculated representative wear amount of the tool 1 and the number of workpieces W machined by the tool 1.

During the machining by the tool 1, the output unit 54 outputs the machining state data calculated by the machining-state calculation unit 53 (step S40). The output unit 54 outputs the machining state data in real time during the machining of the workpiece W. The output unit 54 outputs the machining state data in real time to, for example, a display device.

Figure 7:
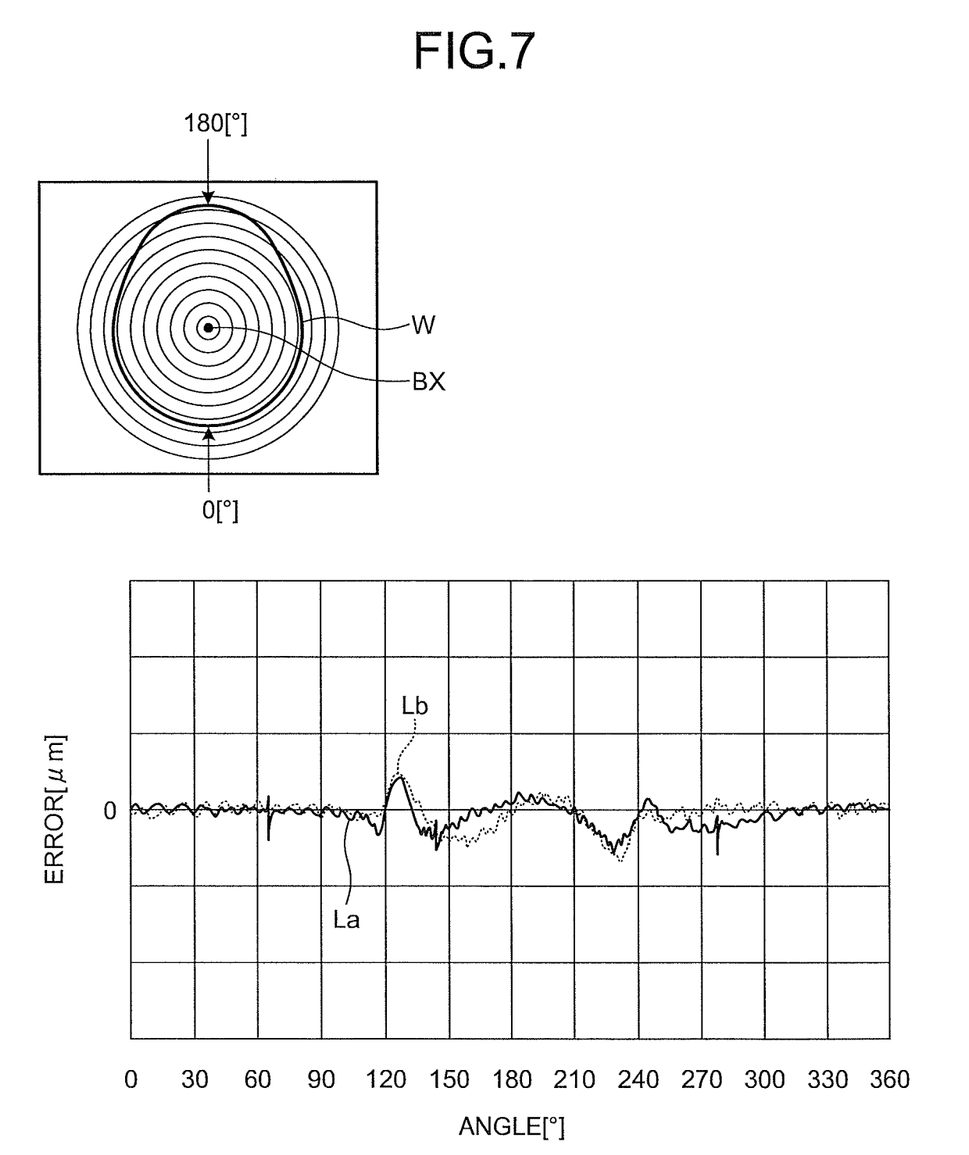
FIG. 7 is a diagram illustrating an example of machining state data calculated by the machine tool according to the present embodiment.

FIG. 7 is a diagram illustrating an example of the machining state data calculated by the machine tool 100 according to the present embodiment. The graph illustrated in FIG. 7 is displayed on the display device.

In the graph illustrated in FIG. 7, the horizontal axis represents the angle of a portion of the workpiece W in the rotational direction when the reference portion of the workpiece W is 0[°]. The vertical axis represents the error data of each portion of the workpiece W with respect to the target shape.

In FIG. 7, a line La indicates the machining state data output from the output unit 54. Since the state quantity data is acquired in the machine tool 100, the machining-state calculation unit 53 can calculate the machining state data of the workpiece W in real time during the machining of the workpiece W. The output unit 54 can output the machining state data of the workpiece W in real time during the machining of the workpiece W.

A line Lb indicates the error data of the workpiece W detected by the inspection apparatus in a post-process after the machining by the machine tool 100. It is understood that the line La and the line Lb sufficiently coincide with each other.

In the machining of the workpiece W by the tool 1, the machining control unit 55 controls the machining condition by the tool 1 based on the machining state data calculated by the machining-state calculation unit 53 (step S50). The machining control unit 55 feedback-controls, based on the machining state data calculated by the machining-state calculation unit 53, at least one of the first motor 12, the third motor 31, and the second motor 23 so that the calculated error is to be 0 [μm].

[Effects]

As described above, according to the present embodiment, the machining state data of the workpiece W is calculated in real time based on the state quantity data acquired during the machining of the workpiece W. The machining state data of the workpiece W includes the error data indicating the shape error variation of the workpiece W with respect to the target shape, and indicates the machining quality of the workpiece W. According to the present embodiment, by using the simulation model, it is possible to virtually calculate the machining quality of the workpiece W, which cannot be directly measured during the machining of the workpiece W, based on the state quantity data and the simulation model by a calculation process.

Thus, it is unnecessary to inspect a machined object using an inspection apparatus in a post-process unlike a conventional technique. Since a large-sized and expensive inspection apparatus is not required, it is possible to reduce the equipment cost.

In addition, the machining quality of the workpiece W is inspected in real time based on the state quantity data acquired during the machining of the workpiece W. Thus, it is unnecessary to separately spare inspection time for inspecting the machining quality. Accordingly, it is possible to inspect the machining quality of all manufactured machined objects at low cost. Thus, shipment of machined objects having poor machining quality is suppressed.

Furthermore, according to the present embodiment, the output unit 54 is provided to output the machining state data in the machining of the workpiece W by the tool 1. Thus, the machining state data calculated by the machining-state calculation unit 53 is output in real time during the machining of the workpiece W. For example, by outputting the machining state data to the display device in real time, it is possible for an administrator to visually recognize the machining quality of the workpiece W in real time via the display device.

In addition, according to the present embodiment, the machining control unit 55 is provided to control the machining condition of the workpiece W by the tool 1 based on the machining state data. The machining control unit 55 can feedback-control, based on the machining state data calculated in real time by the machining-state calculation unit 53, the machine tool 100 so that the shape error of the workpiece W is suppressed. Thus, the machining condition of the workpiece W is optimized in a short time, and machined objects having good machining quality are manufactured efficiently in a short time.

Furthermore, in the present embodiment, the output data d1 of the first motor 12 that generates power for rotating the tool 1 is acquired as the state quantity data. By processing the output data d1 of the first motor 12 with the Kalman filter 52C, it is possible to acquire various types of state quantity data such as the grinding resistance of the tool 1, the machining start point of the workpiece W, and the wear amount of the tool 1.

In addition, in the present embodiment, the rotational speed data d2 of the tool 1 detected by the rotational speed sensor 14 is acquired as the state quantity data. Thus, it is possible to calculate the machining resistance of the tool 1 based on the output data d1 of the first motor 12, the rotational speed data d2 of the tool 1, and the simulation model. By calculating the machining resistance of the tool 1, it is possible to estimate the machining amount of the workpiece W and the bending amount variation of the workpiece W.

Furthermore, in the present embodiment, the bending amount variation data of the workpiece W is calculated. Thus, it is possible to calculate the error data indicating the shape error variation of the workpiece W, based on the control command data output to the third motor 31 and the bending amount variation data of the workpiece W.

In addition, in the present embodiment, the rotational angle data d6 of the workpiece W is acquired as the state quantity data. Thus, it is possible to calculate the contact position C between the workpiece W and the tool 1 based on the rotational angle data d6 and the workpiece model.

Furthermore, in the present embodiment, the output data d3 of the third motor 31 and the positional data d4 of the tool 1 in the feeding direction are acquired as the state quantity data. Thus, it is possible to calculate the surface unevenness data of the workpiece W due to chattering vibration, based on the output data d3 of the third motor 31 and the positional data d4 of the tool 1.

In the above embodiment, the machining condition by the tool 1 has been feedback-controlled based on the machining state data calculated by the machining-state calculation unit 53. For example, the machining state data calculated by the machining-state calculation unit 53 may be stored in the storage unit 56 in association with the serial number of a machined object (product). For example, the shape data of a machined object, which is the final product machined by the machine tool 100, may be stored in the storage unit 56 in association with the time stamp and/or the serial number, or may be stored in an external management terminal via the output unit 54.

In the above embodiment, the machine tool 100 has been described as a grinding device that machines a camshaft and a crankshaft, but is not limited to a grinding device. The machine tool 100 may be a general cylindrical grinding machine, a spherical grinding machine, a machining center, or a wire saw.

Figure 8:
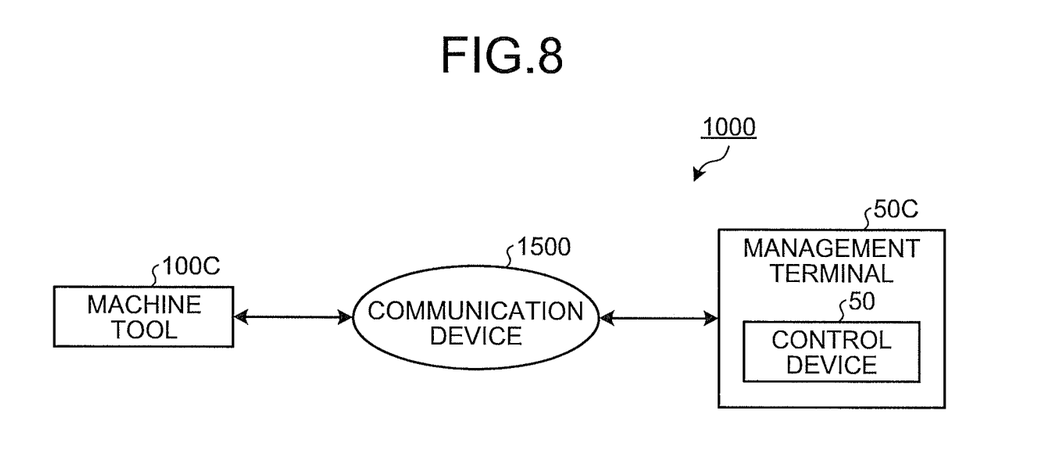
FIG. 8 is a diagram schematically illustrating an example of a machining system according to the present embodiment.

In the above embodiment, the control device 50 has been provided in the machine tool 100. The control device 50 may be a device different from the machine tool 100. For example, as in a machining system 1000 illustrated in FIG. 8, the function of the control device 50 may be provided in a management terminal of a factory. In the machining system 1000 illustrated in FIG. 8, a machine tool 100C and a management terminal 50C having the function of the control device 50 are connected via a communication device 1500. The management terminal 50C performs data communication with the machine tool 100C via the communication device 1500. That is, in the above embodiment, at least one function of the state-quantity-data acquisition unit 51, the state-quantity-estimation-data calculation unit 52, the machining-state calculation unit 53, the output unit 54, the machining control unit 55, and the storage unit 56 may be provided separately from the machine tool 100C.

REFERENCE SIGNS LIST

1 TOOL
2 BASE MEMBER
10 FIRST ROTATING DEVICE
11 SUPPORT MECHANISM
12 FIRST MOTOR
13 STAGE MEMBER
14 ROTATIONAL SPEED SENSOR
20 SECOND ROTATING DEVICE
21 SUPPORT MECHANISM
22 SUPPORT MECHANISM
23 SECOND MOTOR
24 ROTATIONAL ANGLE SENSOR
30 DRIVING DEVICE
31 THIRD MOTOR
32 POSITION SENSOR
40 DRIVING DEVICE
41 FOURTH MOTOR
50 CONTROL DEVICE
51 STATE-QUANTITY-DATA ACQUISITION UNIT
52 STATE-QUANTITY-ESTIMATION-DATA CALCULATION UNIT
52C KALMAN FILTER
53 MACHINING-STATE CALCULATION UNIT
54 OUTPUT UNIT
55 MACHINING CONTROL UNIT
56 STORAGE UNIT
60 CAD DATA HOLDING UNIT
100 MACHINE TOOL
200 CONTROL SYSTEM
1000 MACHINING SYSTEM
AX ROTATIONAL AXIS
BX ROTATIONAL AXIS
C CONTACT POSITION
W WORKPIECE.

The invention claimed is:

1. A machine tool comprising:
a tool configured to machine a workpiece while being in contact with the workpiece;
a state-quantity-data acquisition unit configured to acquire state quantity data of the workpiece and of the tool;
a state-quantity-estimation-data calculation unit configured to calculate state quantity estimation data from a simulation model including a device dynamic characteristic model indicating a dynamic characteristic of the tool and a workpiece model indicating a target shape of the workpiece; and
a machining-state calculation unit configured to calculate, based on the state quantity data and the state quantity estimation data, machining state data indicating a machining state of the workpiece.

2. The machine tool according to claim 1, further comprising an output unit configured to output the machining state data in the machining by the tool.

3. The machine tool according to claim 1, further comprising a machining control unit configured to control a machining condition by the tool based on the machining state data.

4. The machine tool according to claim 1, further comprising:
a first rotating device including a first motor configured to generate power for rotating the tool, wherein
the state quantity data includes output data of the first motor.

5. The machine tool according to claim 4, wherein
the state quantity data includes rotational speed data of the tool, and
the state-quantity-estimation-data calculation unit is configured to calculate machining resistance of the tool based on the output data of the first motor, the rotational speed data of the tool, and the simulation model.

6. The machine tool according to claim 5, further comprising:
a driving device including a third motor configured to generate power for moving the tool or the workpiece in a feeding direction, the driving device being configured to press the tool against the workpiece, wherein
the machining-state calculation unit is configured to calculate bending amount variation data of the workpiece or of the tool based on the machining resistance and the workpiece model, and calculate a shape error variation of the workpiece based on control command data output to the third motor and the bending amount variation data.

7. The machine tool according to claim 6, further comprising:
a second rotating device including a second motor configured to generate power for rotating the workpiece, wherein
the state quantity data includes rotational angle data of the workpiece, and
the state-quantity-estimation-data calculation unit is configured to calculate a contact position between the workpiece and the tool based on the rotational angle data and the workpiece model.

8. The machine tool according to claim 6, wherein
the state quantity data includes output data of the third motor and positional data of the tool in the feeding direction, and
the machining-state calculation unit is configured to calculate surface unevenness of the workpiece based on the output data of the third motor and the positional data.

9. A machined-object manufacturing method comprising:
machining a workpiece by a tool by bringing the workpiece into contact with the tool;
acquiring state quantity data of the workpiece and of the tool in the machining;
calculating state quantity estimation data from a simulation model including a device dynamic characteristic model indicating a dynamic characteristic of the tool and a workpiece model indicating a target shape of the workpiece;
calculating, based on the state quantity data and the state quantity estimation data, machining state data indicating a machining state of the workpiece;
outputting the machining state data in the machining; and
controlling a machining condition by the tool based on the machining state data in the machining.

10. The machined-object manufacturing method according to claim 9, further comprising extracting a machining start point of the workpiece based on output data from a first motor configured to generate power for rotating the tool and on rotational speed data from a rotational speed sensor configured to detect rotational speed of the tool.

11. The machined-object manufacturing method according to claim 9,
   wherein the state quantity estimation data includes machining resistance of the tool, and
   the machined-object manufacturing method further comprising estimating a wear amount of the tool based on the machining resistance and the number of workpieces machined by the tool.

12. A machining system comprising:
   a tool configured to machine a workpiece while being in contact with the workpiece;
   a state-quantity-data acquisition unit configured to acquire state quantity data of the workpiece and of the tool;
   a state-quantity-estimation-data calculation unit configured to calculate state quantity estimation data from a simulation model including a device dynamic characteristic model indicating a dynamic characteristic of the tool and a workpiece model indicating a target shape of the workpiece; and
   a machining-state calculation unit configured to calculate, based on the state quantity data and the state quantity estimation data, machining state data indicating a machining state of the workpiece.

* * * * *